United States Patent
Monassebian et al.

(10) Patent No.: US 12,045,844 B2
(45) Date of Patent: Jul. 23, 2024

(54) INSTANT PERSONAL ELECTRONIC PARKING SYSTEM AND METHOD

(71) Applicant: iPEP, Inc, Great Neck, NY (US)

(72) Inventors: Kelly T. Monassebian, Great Neck, NY (US); Rajarathnam Chandramouli, Holmdel, NJ (US)

(73) Assignee: iPEP, Inc., Great Neck, NY (US)

(*) Notice: Subject to any disclaimer, the term of this patent is extended or adjusted under 35 U.S.C. 154(b) by 0 days.

(21) Appl. No.: 17/968,898

(22) Filed: Oct. 19, 2022

(65) Prior Publication Data

US 2023/0045377 A1   Feb. 9, 2023

Related U.S. Application Data

(62) Division of application No. 17/465,074, filed on Sep. 2, 2021, now Pat. No. 11,514,463.

(Continued)

(51) Int. Cl.
*G06Q 30/0202* (2023.01)
*G06Q 20/02* (2012.01)
(Continued)

(52) U.S. Cl.
CPC ....... *G06Q 30/0202* (2013.01); *G06Q 20/027* (2013.01); *G06Q 20/22* (2013.01);
(Continued)

(58) Field of Classification Search
CPC .. G06Q 30/0202; G06Q 20/027; G06Q 20/22; G06Q 20/3255; G06Q 20/3278; G06Q 30/0185; G06Q 30/0201; G06Q 30/0284; G06Q 50/26; G06Q 2240/00; G07B 15/02; G08G 1/143
See application file for complete search history.

(56) References Cited

U.S. PATENT DOCUMENTS 9,747,797 B1 *  8/2017  Ghosh .................... G08G 1/005
10,893,555 B1 *  1/2021  Han .......................  B60L 53/665
(Continued)

FOREIGN PATENT DOCUMENTS

| CA | 2898994 A1 * | 7/2014 | ......... G06Q 30/0284 |
| CN | 113793507 A * | 12/2021 | |
| WO | WO-2019242832 A1 * | 12/2019 | ............. G06Q 10/02 |

OTHER PUBLICATIONS

CN113793507A—Available parking space prediction method and device thereof, computer equipment and storage medium, 15 pages. (Year: 2023).*

*Primary Examiner* — Tuyen K Vo
(74) *Attorney, Agent, or Firm* — Carter Ledyard & Milburn LLP (57) ABSTRACT

A personal electronic parking system and method adapted to identify, track, predict, alert, manage and collect payment, and enforce on-street and off-street parking, the system including a central cloud network adapted to generate and manage user data and parking data, a user interface adapted to show users parking information relevant to the user, a unique machine-readable code, wherein the code provides identification of a specific vehicle used by the user, one or more sensors, one or more meter devices adapted to connect with the central cloud network and the user interface, and a parking payment and enforcement portal.

19 Claims, 6 Drawing Sheets

Related U.S. Application Data (60) Provisional application No. 63/147,944, filed on Feb. 10, 2021, provisional application No. 63/131,357, filed on Dec. 29, 2020, provisional application No. 63/076,564, filed on Sep. 10, 2020.

(51) Int. Cl.
  *G06Q 20/22* (2012.01)
  *G06Q 20/32* (2012.01)
  *G06Q 30/018* (2023.01)
  *G06Q 30/0201* (2023.01)
  *G06Q 30/0283* (2023.01)
  *G06Q 50/26* (2012.01)
  *G07B 15/02* (2011.01)
  *G08G 1/14* (2006.01)

(52) U.S. Cl.
  CPC ..... *G06Q 20/3255* (2013.01); *G06Q 20/3278* (2013.01); *G06Q 30/0185* (2013.01); *G06Q 30/0201* (2013.01); *G06Q 30/0284* (2013.01); *G06Q 50/26* (2013.01); *G07B 15/02* (2013.01); *G08G 1/143* (2013.01); *G06Q 2240/00* (2013.01)

(56) References Cited

U.S. PATENT DOCUMENTS

| | | | |
|---|---|---|---|
| 11,081,004 B1* | 8/2021 | Higuchi | G08G 1/142 |
| 2014/0062727 A1* | 3/2014 | Aivas | G08G 1/144 |
| | | | 340/932.2 |
| 2014/0214319 A1* | 7/2014 | Vucetic | G01C 21/3407 |
| | | | 701/540 |
| 2017/0213262 A1* | 7/2017 | Kelley, II | G06Q 20/3224 |
| 2017/0323227 A1* | 11/2017 | Sadeghi | G06Q 20/102 |
| 2020/0160712 A1* | 5/2020 | Beaurepaire | G08G 1/148 |
| 2020/0193722 A1* | 6/2020 | Moran | G06Q 20/401 |

* cited by examiner

INSTANT PERSONAL ELECTRONIC PARKING SYSTEM AND METHOD

This application is a Divisional of U.S. patent application Ser. No. 17/465,074 filed Sep. 2, 2021, entitled "INSTANT PERSONAL ELECTRONIC PARKING SYSTEM AND METHOD," which claims priority to U.S. Provisional Patent Application No. 63/076,564 filed Sep. 10, 2020, entitled "PERSONAL ELECTRONIC PARKING METER DEVICE," U.S. Provisional Patent Application No. 63/131,357 filed Dec. 29, 2020, entitled "PERSONAL ELECTRONIC PARKING METER DEVICE," and U.S. Provisional Patent Application No. 63/147,944 filed Feb. 10, 2021, entitled "PERSONAL ELECTRONIC PARKING METER DEVICE," which are hereby incorporated by reference herein.

The present invention relates to a personal parking system, more particularly, a method and system that handles parking related payments, parking enforcement, and predicts and recommends parking for its users.

BACKGROUND

The current state of the art provides drivers with disjointed apps, meter kiosks and street signs to locate available and permissible parking spaces and to pay the parking fees. Drivers waste time and money trying to find available parking and to pay for parking fees, for both on-street and off-street parking. Drivers can spend hours looking for and then paying for parking with the currently available parking systems.

SUMMARY OF THE INVENTION

The present invention provides an instant personal electronic parking system ("iPEP™") that gives a user the tools to efficiently locate and pay for on-street and off-street parking. Using the iPEP system, a driver can efficiently locate and quickly pay for both on-street and off-street parking. The iPEP system also allows automatic identification, tracking, predicting, managing, alerting, regulating and enforcing on-street and off-street parking from manually or automatically entered data. The resulting data may be generated by one or more cameras, microphones, crowdsourced data from community users, or sensors, (for example, RFIDS, proximity, or other physical sensors). The iPEP system allows a user to input parking information into a user interface such as a hardware device or application, and make, manage and track payments associated with parking vehicles, such as parking meters or tolls.

The present invention also provides parking enforcers, such as municipality regulators, the ability (remotely or through enforcement personnel) to issue violation notices, track and regulate violations, and collect fees for parking violations.

The present invention also provides automatic parking availability detection using sensors such as cameras, audio, or proximity detectors. The parking availability is shared with the users on their user interfaces via a cloud network, or on a local wireless network.

The present invention also provides a machine learning system that uses algorithms to predict parking availability and recommend parking zones based on collected data including from crowdsourcing.

The present invention also provides the ability to share user data with third party services to provide the user with coupons, discounts, or other incentives to share parking data.

The present invention provides a personal electronic parking system adapted to identify, track, predict, alert, manage and collect payment, and enforce on-street and off-street parking, the system including a central cloud network adapted to generate and manage user data and parking data, a user interface adapted to show users parking information relevant to the user, a unique machine-readable code, wherein the code includes identification of a specific vehicle used by the user, one or more sensors, one or more meter devices adapted to connect with the central cloud network and the user interface, and a parking payment and enforcement portal.

The present invention also provides a method for managing and enforcing personal parking for on-street or off-street parking, the method including the following steps: providing a personal parking payment and enforcement ability and providing with parking availability predictions and recommendations.

The present invention also provides a machine learning system for on-street and off-street parking availability predictions and recommendations, the system including a cloud network, at least one storage unit, at least one sensor interface, a predictor model, a recommender model, and a classifier, wherein the classifier collects and extracts data for a parking predictor model and a recommender model.

DESCRIPTION OF THE DRAWINGS

Further objects, features, and advantages of the invention will become apparent from the following detailed description taken in conjunction with the accompanying figures showing illustrative embodiments of the invention, in which.

DETAILED DESCRIPTION

The iPEP system allows drivers to use their user interfaces, for example, mobile device, hardware device or a vehicle's on-board information system, to find parking in a desired location, at a specific time and for a particular duration. The iPEP system provides real-time parking updates from other iPEP users; allows a user to pay for parking; and retains a log of all parking transactions in the user's account, viewable on the user's mobile device or the vehicle's on-board information system, for example.

The iPEP system also allows municipalities to receive real time parking violation information, scan vehicle identification codes (e.g., barcodes) to issue violation notices, enable system generated parking violation notices, enhance capabilities to collect fees for parking violations, and track parking patterns and violations.

A user must register and create a personal account to use and access the iPEP system. The user may create the account via website or mobile application, for example. Users can access their account on different devices and may sign out of their account and sign in at a later time. Users have access to a "Homepage" which displays information such as a current parking session, parking payment activity and history, notification settings, language choices, payment methods, and/or vehicle options. The user can register multiple vehicles on the same account. Vehicles can be added to an account by registering the vehicle and receiving an associated machine-readable code, unique to the vehicle, or adding a pre-registered vehicle to the account.

The user interface receives, processes and displays available on-street and off-street parking information in real-time. This may be a mobile device via a mobile app, a computer via a website, a vehicle's onboard information system such as Carplay via IOS or Android auto, or on an iPEP-HD.

iPEP system 1 provides the user with a map that displays parking-related information. The information shown is based on the user's current location and time, or that of which the user manually inputs, for example, parking at a different location and/or time. The map displays available on-street parking in real time (free and/or metered); nearby parking zone identification codes, for example, alphanumeric codes or barcodes, available for on-street parking payment; available off-street parking options and deals in real-time; parking alerts and reports; and nearby stores, restaurants and gas stations with available discounts and coupons.

Figure 1:
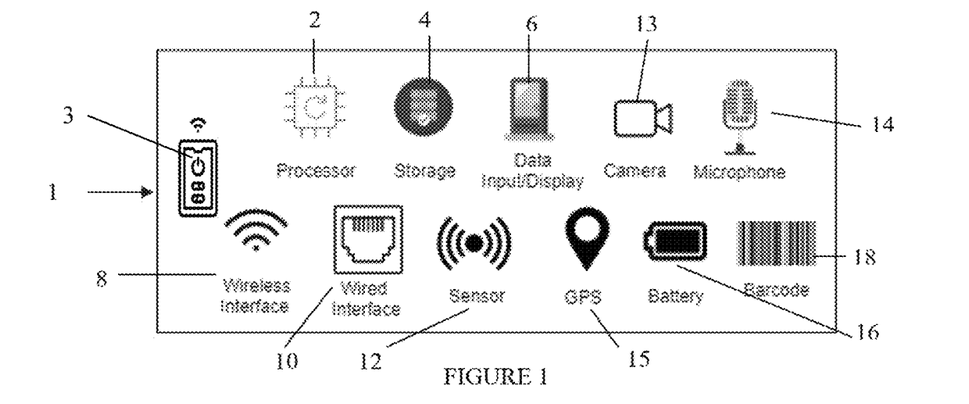
FIG. 1 shows an exemplary embodiment of the elements included in the iPEP system.

FIG. 1 shows an exemplary embodiment of iPEP system 1 components. System 1 may include at least one processor 2, at least one storage unit 4, data input and display 6, wireless interface 8, wired interface 10, sensors 12, power source 16 and machine-readable code 18. Sensors 12 may include a proximity sensor or antennae, RFID, camera 13, microphone 14 and/or GPS 15. Data collected from sensors 12 is stored in one or more expandable internal storage memory 4. The data may be stored for one or more days. Processor 2 performs computations on the stored or live data to extract different types of information. Data input and display interface 6 (user interface) may include a keyboard, touch screen, and/or voice input for data input. The user interface includes all user interaction modalities such as a personal computer, mobile device, a hardware device, an onboard vehicle system, or any other suitable device, software, interactive modality or other mechanism able to integrate, manipulate and/or operate the personal electronic parking system and allow a user to input information. This includes typing on a mobile device, voice input (e.g., Alexa interface), gesture interfaces (augmented or virtual reality), or brain-machine interfaces. The user can use this to input data such as the parking zone identification codes and parking duration. This may be input manually or automatically selected. The entered data is collected and processed by computational processor 2. The processed data is stored in internal storage memory 4. It is also displayed on a screen of interface 6 and can be mirrored on an external device for display. The entered data can be displayed in a variety of formats and languages. The data displayed may include the date, parking zone identification code, parking location, parking status, machine-readable code, remaining time, and/or other parking related information, for example.

Raw data, processed data, extracted information, alerts, and other types of output are transmitted to an iPEP-HD or an external user device via a wireless 8 or wired interface 10, allowing the iPEP-HD display to mirror with a mobile device, for example, over at least one network interface. Wireless interface 8 may consist of a multitude of connections of network interfaces such as cellular, Wi-Fi, RFID, satellite, LTE, and 5G encompassing local area network (LAN) and wide area network (WAN).

Machine-readable code 18 is unique for each vehicle. Machine-readable code 18 encodes different types of information such as vehicle identification, parking time usage status, and links to payment gateways. Code 18 may be an analog or digital barcode or QR code, for example. It can be affixed to a vehicle's windshield, such as a barcode sticker, or be part of the iPEP-HD. Code 18 can be scanned by other devices to extract the encoded information. Machine-readable code 18 may be scanned by parking enforcers to access the vehicle's parking information. Code 18 may include a lighting option that turns color based on a vehicle's parking status. For example, the code is colorless while the vehicle is in motion, red when the user's parking session is unpaid or has expired, and/or green when a user's parking is paid and active.

Street based/installed hardware devices with antennas ("meter devices") 3 enhance and ultimately replace the use of current parking meter machines. Meter devices 3 collect and transmit available parking information and provide relevant information to municipalities and parking enforcement personnel. Meter devices 3 communicate wirelessly or via wireline network with other similar devices or cloud servers, provides, or can perform functions of a parking meter machine. It can be used with currently installed parking meter machines and/or as a standalone apparatus. iPEP system 1 is accessible via meter device 3. Meter device 3 includes an antenna and may also include a camera 13 and audio recording 14. Meter device 3 connects to parking software systems both off and online, whether the parking systems are used via a website, mobile application, car application, and/or iPEP-HD, for example.

Together with iPEP system 1 or another parking payment system or software, the meter device connects to parking system's payment platforms to receive and collect parking payments from the users, visualizes and estimates available parking spaces that will accommodate a vehicle based on its size, provides information about how long a car has been parked after parking expiration, helps turn over parking spaces, tracks parking patterns, counts and monitors every car that parks in a parking space, provides information about how long a car has been parked after parking expiration, and informs and alerts parking regulators, personnel and enforcers when vehicles are parked in an impermissible parking zone, parked beyond the permissible parking time, and/or whether free or metered. Both the vehicle users and parking enforcers benefit from these alerts. The meter device provides parking system users with parking information to pay for parking on the system platforms. For example, the meter device will provide and/or transmit information such as an area's parking zone identification code and its permissible parking allotment of time. The meter device will connect to parking system payment platforms to receive and collect parking payments from their users. Power source 16 may be a rechargeable battery or other power source.

Figure 2A:
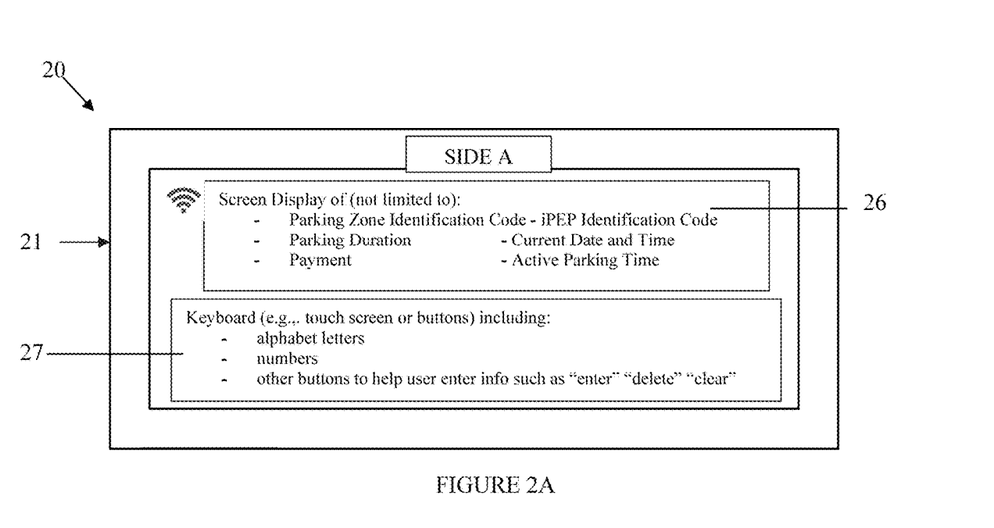
FIGS. 2*a* and 2*b* show an exemplary embodiment of elements included in an iPEP hardware and firmware device ("iPEP-HD")
Figure 2B:
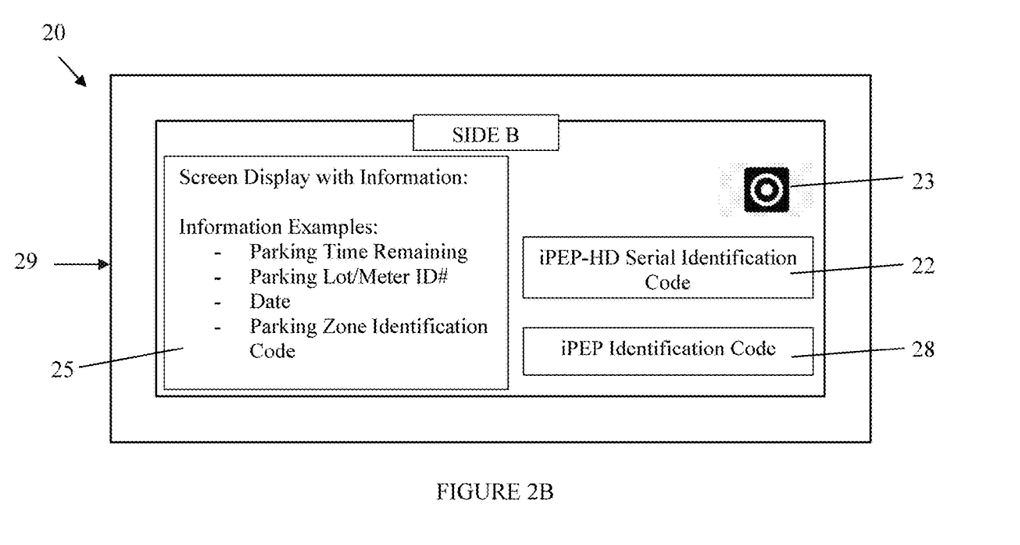

The iPEP system may include iPEP-HD 20, as shown in FIGS. 2a, and 2b. iPEP-HD 20 is a standalone hardware device that provides an iPEP user with an offline option to pay for metered parking with wireless signal strength. iPEP-HD 20 allows users to pay for parking from within the vehicle on a separate hardware device. In order to use iPEP-HD 20 a user must have (or create) an iPEP account.

Each iPEP-HD 20 is associated with at least one vehicle and its vehicle machine readable code 28. iPEP-HD 20 is connected to the user's personal account. iPEP-HD 20 may also be accessed by website or a mobile app, for example, if a user wants to remotely change a payment method or add parking time to iPEP-HD 20. Device 20 may be embedded into the vehicle. If the user already has an iPEP account, iPEP-HD 20 can be activated by adding the device serial identification code 22 (e.g., a number or barcode) to the user's account, choosing the vehicle that the device will be used for and the user's preferred payment method.

iPEP-HD 20 may be any shape, for example rectangular, having at least one side 21 with at least one display screen 26 and buttons 27 (or a keyboard) for the user to input information. Display 26 may be a touchscreen. Buttons 27 may include number digits that may be used by a user to input information such as a parking zone identification code of the area the user parks a vehicle and/or the amount of time the user's vehicle will be parked in the specified parking zone. Buttons 27 may also include arrows, "enter" and "clear," for example, that may be used to help the user move around screen 26 and input information. After the user inputs the relevant vehicle information, display screen 26 may display the "Parking Zone Identification Code," "Parking Duration," "Payment Information," "Barcode," and/or "Time Remaining." Additional display features and options may be added which include a "Current Time" and/or the date on screen 26. Device 20 may have a second side 29 which may include a camera 23, a machine-readable code, such as barcode 28, device 20 serial identification code 22, and/or an additional display 25. Camera lens 23 may be used to take a picture and/or scan images to obtain parking related information, for example, a parking zone identification code, such as a barcode, on a street sign. iPEP-HD 20 can scan an identification code, such as a barcode, on an on-street sign or use its camera to take a picture of the parking zone identification code or other relevant information, and decode the code for the user, for example, in an image to text conversion, to complete the parking process. Machine-readable code 28 is a personal and/or vehicle identification code (for example, an alphanumeric code or barcode) that the user obtains when device 20 is registered after purchase. iPEP-HD 20 may be associated with one or more machine-readable codes 28 if the user has more than one on their account. If there is more than one machine-readable code 28 on the user's account, the user will select which code the parking payment will be associated with. Raw data, processed data, extracted information, alerts, and other types of output may be transmitted to an external device via a wireless or wired interface allowing the iPEP-HD display 26, 25 to mirror with a mobile device, for example, over at least one network interface. iPEP-HD 20 may interoperate with IOS or Android devices via applications such as CarPlay and Android auto. The display may also include a lighting system that changes color to indicate parking information such as the vehicle's parking and/or payment status, the remaining permitted parking time, the iPEP hardware health (when relevant), network connectivity, or other relevant information.

Figure 3:
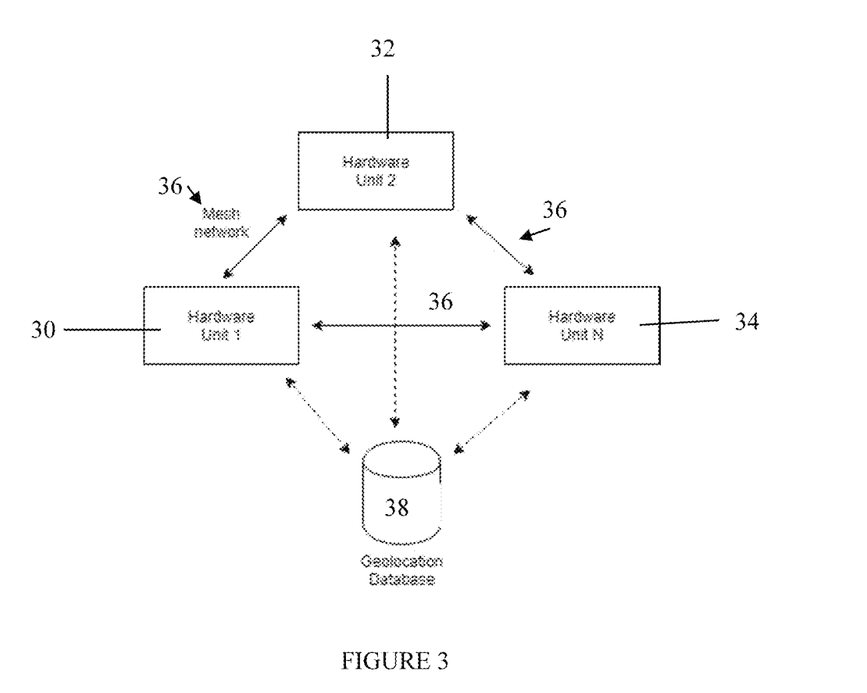
FIG. 3 is a flow chart showing communication between multiple iPEP system user interfaces.

FIG. 3 depicts how multiple iPEP user interfaces automatically communicate and exchange information with each other when located in the same vicinity. Each user interface of the iPEP system automatically geolocates information such as the parking zone and parking meter, based on wireless geolocation, GPS interface or IP geolocation. Multiple devices 30, 32, 34 form a mesh network 36 via one more wireless or wired interfaces. Information between iPEP user interfaces 30, 32, 34 can be exchanged in a peer-to-peer network. These devices 30, 32, 34 may also exchange information with geolocation database 38. Geolocation database 38 automatically provides stored and real-time information. This information includes the parking zone, on-street parking, off-street parking such as a parking garage and/or parking duration. This information is gathered and shared via GPS interface, cloud geolocation database, IP geolocation or changes to geolocation coordinates over time. Independent parking payment applications or parking enforcement applications may connect with each user interface on the iPEP system.

Parking Payment Process

To pay for parking for a specific vehicle, the vehicle must be registered on the user's account. Users add their preferred payment method, for example, credit card, to their accounts. They can select to pay for the transaction on an individual basis, with prepaid funds added to their account, and/or on a monthly basis.

Users are able to pay for on-street parking using the iPEP's system payment platform via the user interface. To complete the parking payment transaction, the user provides parking information such as a parking zone identification code, a parking time duration, the vehicle being parked, and a selected payment method. To input the parking zone identification code the user can enter it manually, scan or take a picture of the code, select it as provided by the system and/or select the applicable parking zone identification code on the map. The parking duration for the vehicle's parking session must be permissible under the parking identification code. If more than one vehicle belongs to the user's account, the user must specify the applicable vehicle being parked. After the parking payment transaction is complete, the user's interface and homepage will display parking information such as the current active parking session and its duration. The vehicle's machine-readable code will be activated with the driver's parking status and provide on-street parking enforcers proof of the user's parking payment. The iPEP system will alert the user before a parking session is about to expire. The user may extend the parking session if available and permissible under the parking zone.

iPEP users can also pay for off-street parking on the iPEP payment platform. The user provides parking information including the parking venue, parking duration, vehicle being parked and the payment method. Users can enter the desired parking location, parking time and duration on an iPEP map. The iPEP map will then display available off-street parking venues and their costs. The user must select one of the available parking options displayed. After selecting the displayed parking option, users can reserve and pay for a parking spot in the selected parking venue. After the parking transaction is complete, the user will receive a machine-readable code, via the user interface, to show the off-street parking enforcer or entity, such as a parking garage, proof of the parking payment and reservation. The vehicle's machine-readable code will be activated with the driver's parking status and provide off-street parking enforcers, such as parking garages, proof of the user's parking payment. The user's interface, such as a homepage, will display parking information such as the current parking session and its duration. The iPEP system will alert the user when parking is about to expire and allow the user to extend the parking session if available and permissible by the parking venue. iPEP users can split on-street and off-street parking payment costs with other participating in-vehicle parkers. Those splitting payment can log into their account or sign in as a guest user.

A user can pay for parking using the iPEP-HD by using the relevant buttons to input parking information including a parking zone identification code of the area the user parks the vehicle and enter the time duration for the vehicle to be parked in that space.

Figure 4:
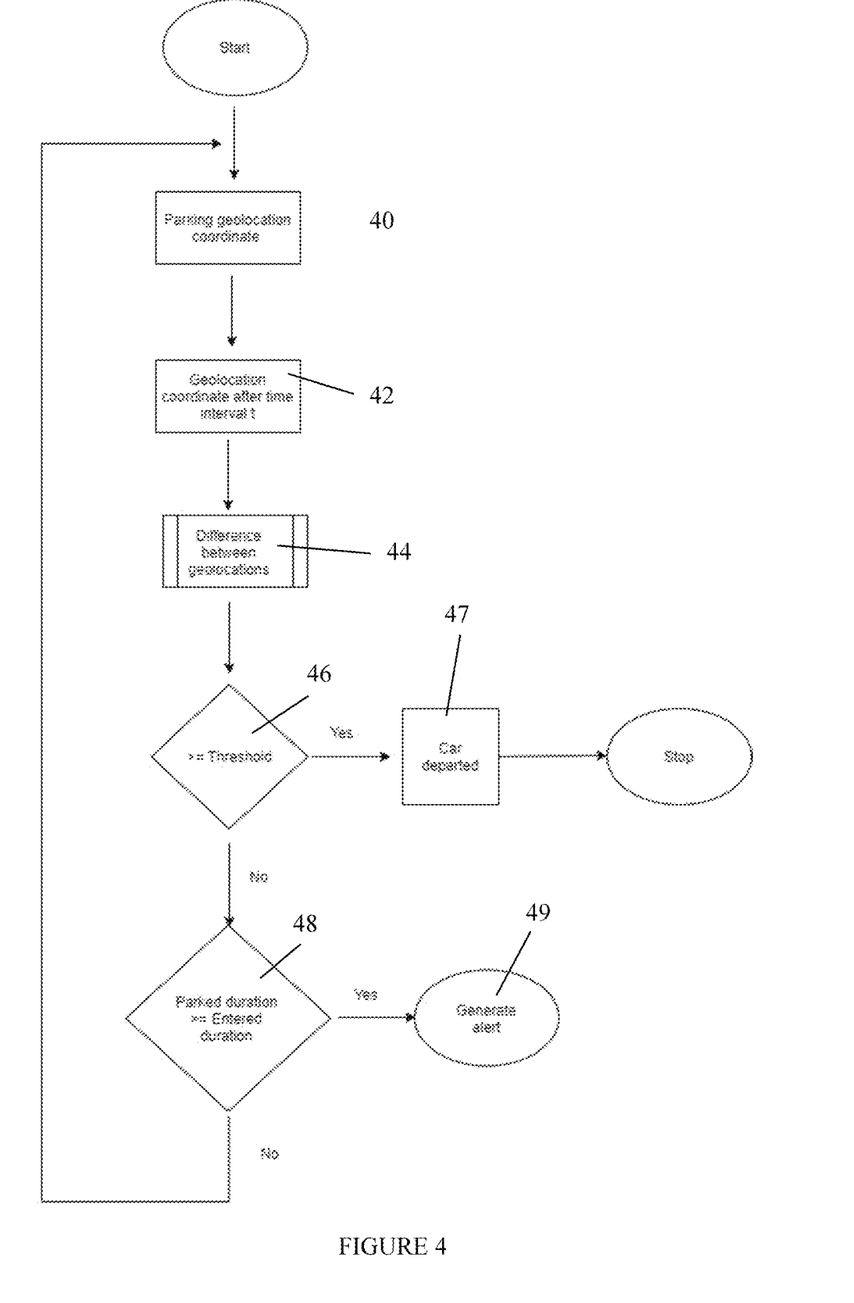
FIG. 4 is an exemplary flow chart for the automatic parking payment process.

FIG. 4 is a flow chart that shows the automatic parking payment process ("PPP"). This is a software application that is used in the iPEP system. The PPP may also be used on a standalone basis. PPP allows a user to make, manage, collect, regulate and track the payment of parking meters, tolls and other charges associated with the vehicle. The PPP also includes software that allows a scanning device to determine whether the vehicle is in compliance with applicable parking regulations. Scanning functionality will allow the scanning of barcodes or other machine-readable codes. PPP also enables the user to select applicable parking zone identification codes or similar designations either automatically or as an option to select by the user when inputting information into the user interface of the iPEP system.

The PPP is shown in FIG. 4. The geolocation coordinates of a parked vehicle are determined at step 40 from a geolocation database query, automatic geolocation with cellular or Wi-Fi triangulation, GPS, manual input, or other methods. The coordinates are periodically checked by the iPEP system using PPP and confirmed after an interval of time at step 42. The time period for checking (e.g., t) for geolocation coordinates may be fixed, adjustable according to a pre-determined policy, or dynamically updated depending on external data. The difference between two consecutive geolocations is computed by a cloud server or the iPEP system after they are checked at step 44. In one embodiment, a threshold detector is applied to the computed difference to determine if there is a change at step 46. This threshold may be fixed and pre-determined, dynamically adjusted depending on external data, or two thresholds may be used for assessing the confidence in coordinate change detection. If a change is detected, the departure of the vehicle from that parking location is ascertained, at step 47 and the coordinates are no longer checked. If a change is not detected, the parking duration is compared against manually entered parking duration at step 48. If the parking duration is larger than the manually entered time, an alert is generated at step 49 and sent to the user with a suggestion for extending the parking duration. If the duration is shorter than the entered time, the entire process is repeated from the start.

Parking Enforcement and Violation Payment Collection

Figure 5:
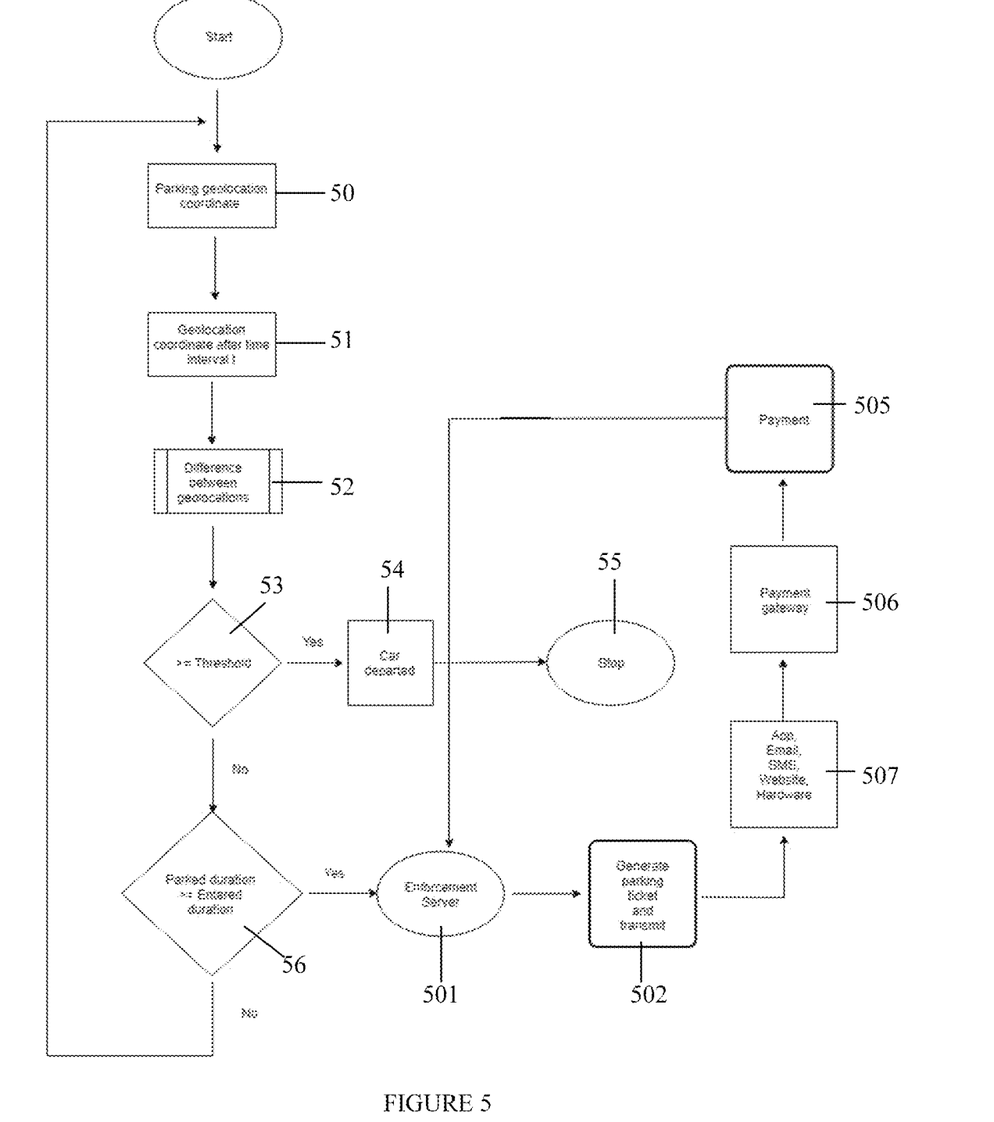
FIG. 5 is an exemplary flow chart of a parking enforcement and violation payment collection process.

The iPEP system also provides functionality for parking enforcement. The iPEP system enables parking enforcement personnel to access, regulate and monitor parked vehicles. FIG. 5 provides a flow chart of the parking enforcement and violation payment collection process. The geolocation coordinates of a parked vehicle are determined at step 50 from a geolocation database query, automatic geolocation with cellular or Wi-Fi triangulation, GPS, manual input, or other methods. The coordinates are periodically checked by the iPEP system using PPP and confirmed after an interval of time at step 51. The time period for checking (e.g., t) for geolocation coordinates may be fixed, adjustable according to a pre-determined policy, or dynamically updated depending on external data. The difference between two consecutive geolocations is computed by a cloud server or iPEP system after they are checked at step 52. In one embodiment, a threshold detector is applied to the computed difference to determine if there is a change at step 53. This threshold may be fixed and pre-determined, dynamically adjusted depending on external data, or two thresholds may be used for assessing the confidence in coordinate change detection. If a change is detected, the departure of the vehicle from that parking location is ascertained at step 54 and the coordinates are no longer checked at step 55. If a change is not detected, the parking duration is compared against manually entered parking duration at step 56. If the parking duration is larger than the manually entered time, alerts are sent to enforcement authorities via their enforcement server at step 501. The enforcement servers may generate a parking ticket and transmit it to the user of the violating vehicle at step 502. The notification may be transmitted to the user via an application, email, SMS, website or the iPEP-HD. A payment gateway 504 is provided to the user and the user can provide payment at step 505 for the violation which is sent to the enforcement server.

The parking enforcement functionality compares the parking duration computed in step 52 with database entries consisting of the parking time limit to determine if the parking duration has exceeded the parking time limit eligibility including parking time limit. The computed time duration is compared against a threshold to determine parking validity. The system then transmits the vehicle's parking data to an authorized parking enforcement server. The iPEP system can automatically send alerts of parking violations to parking enforcement authorities or personnel, that may be remotely located, via SMS or other digital channels for parking expiry. It is not necessary for parking enforcement personnel to leave their office. They can be notified at their desk, for example, via the cloud of violations. iPEP users can then be notified of tickets, etc. on their user interface. The alerts may include registration code (e.g., a number), vehicle ownership information and/or rental company information. The user's vehicle machine-readable code may also be manually scanned by parking enforcement authority or personnel for parking enforcement. A parking enforcement authority can also input a license plate code (e.g., an alphanumeric code) into a handheld device connected to an enforcement cloud server. Once scanned or a license plate has been input, parking payment related information is displayed such as outstanding parking tickets and past payments. This allows the enforcing authorities to communicate and exchange data with the violating iPEP users and generate electronic parking violations and payment information. This communication between the users' iPEP interfaces and parking enforcement enables parking ticket delivery and tracking, as well as parking ticket payment from the users.

The iPEP system also provides parking information to the parking enforcer, such as a municipality, including the number of vehicles parked in a specific zone, parking/payment information as well as statuses of parked vehicles, and the number of vehicles parked in an off-street venue. This information can help enforcers discern vehicles parked in violation of parking rules, track parking patterns and violations, collect fees for parking violations, and issue violation notices.

Parking Prediction and Recommendation

Figure 6:
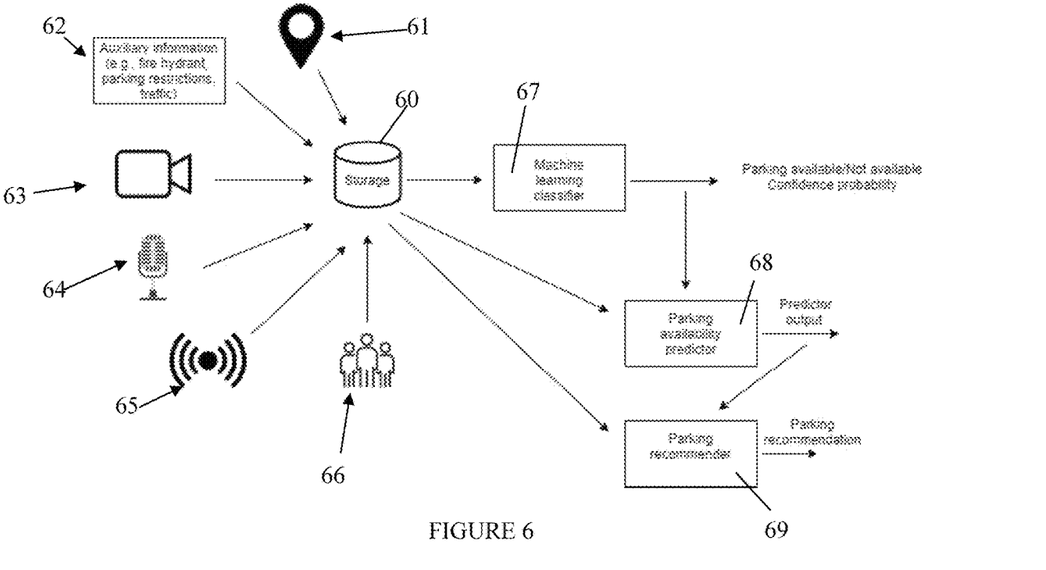
FIG. 6 shows a machine learning system for parking prediction and recommendation.

FIG. 6 shows a machine learning system of the iPEP system for parking availability predictions and recommendations. The machine learning system is on a cloud server. Storage system 60 is on a mobile edge or cloud or distributed between the edge and cloud. Storage system 60 collects data from several sensor interfaces from the meter devices. The sensor interfaces include, but are not limited to, GPS 61, auxiliary information 62, such as fire hydrant or local traffic conditions, video feed 63, such as a single image or video frame from one or more cameras, audio input 64, such as a microphone or traffic noise, proximity sensory information 65 about nearby vehicles or other objects, and crowdsourced information 66. Video feed 63 is used to provide input of features including identifying the presence or absence of a vehicle; identifying empty space between parking lines, markings or similar demarcations such as a fire hydrant, obstructions, or other parking hinderances; or measuring distance between vehicles. Audio input 64 provides input of features used to identify local road conditions, for example. Video feed 63 and audio input 64 may be combined and used together to input features. Proximity sensor information 65 can assist in identifying empty parking spaces. Crowdsource information collection 66 includes public, private and governmental parking data.

Machine learning classifier 67 is deployed on the edge nodes, cloud, or hybrid edge-cloud infrastructure. Classifier 67 identifies important features such as time series patterns, vehicle occupancy patterns, parking zone vacancy patterns and road traffic patterns, from the collected data. Classifier 67 extracts these features, pre-trains predictor 68 and recommender models 69, and predicts parking availability or recommends parking locations. Classifier model 67 may be developed offline. Classifier 67 may also operate in a model-free reinforcement learning environment whereby it learns and corrects its decisions dynamically and in real-time from data and received feedback. The features of the machine learning model may include space, time, audio pitch, audio intensity, background noise intensity, vehicle-specific audio features, computer vision features such as detected video objects, bounding boxes, and confidence values, proximity features, vehicle exhaust features, and natural language features extracted from crowdsourced data.

In the model-based machine learning classifier system 67, a pre-built model for parking is deployed on edge nodes or in the cloud. The model is periodically updated as new data is collected. Classifier 67 outputs predicted availability of parking in a location and time by comparing the collected data with the pre-build data model. The output of classifier 67 may be binary, parking available or not available; or non-binary, a probability output associated with the availability or unavailability. Machine learning system 67 combines the results of data computations performed by the cloud server processor and communicates with other user interfaces to detect parking availability information for broadcasting alerts. Machine learning system 67 includes a predictor 68 and recommender 69. The system is trained on a remote server to preface available parking spaces over time and spatial area. Historic data is collected to pre-train a machine learning parking availability predictor. The input to this predictor encompasses spatial and time-related sensory and crowdsourced data as shown in FIG. 6. Historic data is input to a remote server. This data includes parking data alerts, image video, microphones, proximity sensors, geolocation, weather data, public service announcements, private garage announcements, other data sources, days of the week, time and other data.

Collected data may be filtered to remove anomalies, estimate missing values, denoise, interpolate, and undergo other operations to prepare for machine learning model building. Crowdsourced data may also be filtered considering the reliability, reputation, and other behavioral and personal attributes of the data contributor.

Once trained, predictor 68 sends alerts based on prediction to the iPEP system user interface regarding vehicular information, such as parking or traffic conditions. Predictor 68 takes inputs from the users for continual training of the machine learning predictor 68. Historical data and the user input, such as crowdsource data, are used to compute the confidence probability for prediction.

Machine learning parking availability predictor 68 may consist of several sub-predictors. Each sub-predictor may predict individual features or attributes of the data input. A meta predictor combines the outputs from each of the sub-predictors for a final prediction. This hierarchical predictor system updates itself periodically in fixed time intervals or as sufficient new data is collected. Feedback from the users, such as to upvote or downvote, on the predicted output, the automatic computation of prediction errors, and feedback from parking garages or public parking may be used as signals to update the parking availability models and predictions.

The iPEP system also provides parking recommender 69 recommending parking locations to users based on their past behavior, personal requirements, cost, or other attributes. Recommender 69 takes the predicted parking availability matrix of the machine learning predictor 68 as an input and automatically ranks the order from the most to least recommended for an individual user. The ranking is based on several metrics. These metrics may include the user's profile, shortest distance to parking location, safest, cheapest, hours of operation, or other attributes. External data such as discounts, coupons, promotions from local businesses, and/or other factors may also be used to influence the ranking and parking recommender 69. Recommender 69 continually learns and improves itself with fresh data collection. It will dynamically update recommendations with new data and can improve data quality with user incentives. Both the iPEP prediction and recommendation models may be used offline. No changes will be noticeable to the user.

Crowdsourcing Data Collection

Figure 7:
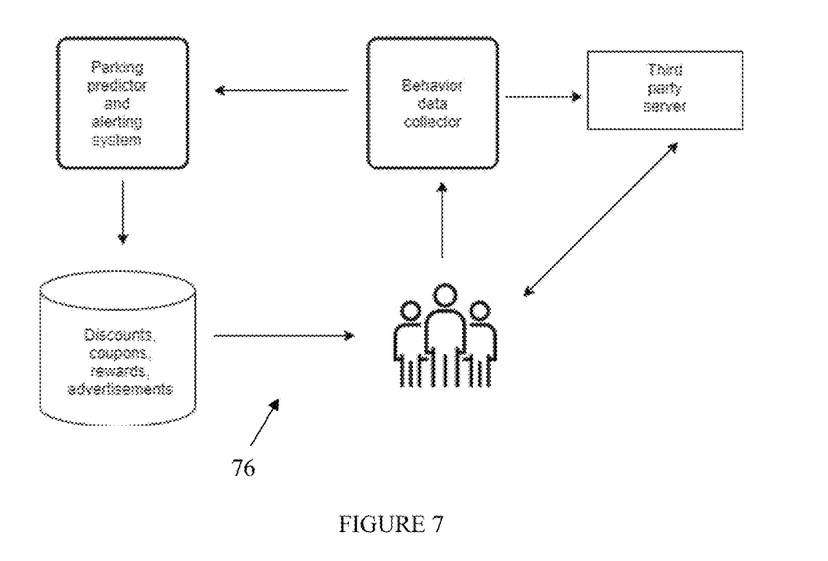
FIG. 7 shows an exemplary embodiment of crowdsourcing data collection.

The iPEP system may include a crowdsourcing data collection process for data used for parking predictions and recommendations. FIG. 7 shows a crowdsourcing data collection system 76 used for parking prediction and recommendations. Behavioral data may be collected from individual iPEP users via mobile applications, iPEP-HD, car software, websites, or other user interfaces or from third-party servers or services. Behavioral data includes spatial-temporal parking patterns, choices of parking locations or garages, usage of coupons or promotions, parking duration, and vehicle type. The behavioral data collection may be shared with the machine learning parking predictor or third-party servers. Additional behavioral patterns may be collected with feedback from third-party applications or services. Data collection frequency may be influenced by the accuracy of the parking availability predictor and recommender, delivery of advertisements or promotions from third-party servers, or other factors.

Users can also share and update information on what they encounter when looking for parking through real-time for other users to see and benefit from. Users can submit their reports on their maps via the user interface or from their homepage, for example, for other users to see on their map. Examples of such reports and alerts include street closures, parking machine or parking zone failures, weather conditions (e.g., snow mounts in parking spots), street congestion parking zone meter identification code not working, new bike lanes, user leaving a spot and reporting availability, active parking enforcers working, accidents, restaurant seating on sidewalks, construction on a block, and hydrants or driveways. Every additional user on the iPEP system platform will increase the ease of parking and the value to other users. Users can respond to messages and reports that relate to themselves, their location and their parking desires.

Incentives and Advertisements

In order to provide incentives for data crowdsourcing, advertisements may be displayed, or rewards and/or products offered. The advertisements may include discounts, coupons, or free parking. The advertisements may be paid advertisements. Reward points may be offered for data contribution. Products or services may be delivered to a parking lot, vehicle or other parking related location.

Information gathered from the iPEP system may be shared with third parties. For example, parking behavior, parking location, and/or parking duration may be shared with auto insurance companies, car rental companies or other third parties. Vehicle type, color, location, and related data may be shared with auto related companies or other enterprises.

The iPEP system maps will display brand advertisements based on a user's location and time. The ads are displayed in the user's iPEP map. The in-map ads allow a user to locate nearby gas stations, restaurants and stores. The map will also show deals and discounts whereby the user can click on the ads to receive the deal/discount and place orders in advance, when available. The advertisements may be displayed on the map as branded pins, zero-speed takeovers or promoted search ads, for example. Branded pins are dropped in the user's map like a store sign. They will show up in the vicinity that the user seeks to park. They will also raise company awareness and draw in-route and parking customers to their stores. Zero-speed takeover ads are displayed to the user as a digital billboard. They pop up when the user comes to a complete stop for at least 3 seconds, for example, once the vehicle is parked. Promoted search ads are displayed when a user is searching for a movie theatre, restaurant or store.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing and enforcing personal parking for on-street and off-street parking, the method comprising the following steps:
    providing available on street and off street parking space information and current or future parking availability predictions and recommendations for specific parking spaces to a user using adaptive machine learning models incorporating historical parking data and continually updating current parking data;
    displaying relevant available parking space information in real time based on the parking space availability predictions and recommendations;
    the user parking a vehicle in a parking space based on the parking space availability predictions and recommendations; and
    providing a personal parking payment, payment collection and enforcement ability to the user, wherein the user remotely makes payments for parking and/or parking violation fines.

2. A method for managing and enforcing personal parking for on-street and off-street parking, the method comprising the following steps:
    registering a vehicle with a personal electronic parking system user's personal electronic parking system account;
    selecting a payment method in the personal electronic parking system user's account;
    parking the vehicle in a parking space;
    entering an initial desired parking time for the vehicle in the parking space by the personal electronic parking system user establishing a parking session;
    determining a first set of geolocation coordinates of the vehicle for the parking session;
    determining a second set of geolocation coordinates of the vehicle after a confirmed time; and
    comparing the first set of geolocation coordinates and the second set of geolocation coordinates, wherein
        if a change is detected between the first set of geolocation coordinates and the second set of geolocation coordinates, a departure of the vehicle is determined, and additional geolocation coordinates are no longer determined for the parking session;
        if a change is not detected between the first set of geolocation coordinates and the second set of geolocation coordinates, comparing a current parking duration against the initially entered desired parking time for the parking session, wherein if the parking duration is longer than the initially entered parking time, generating and sending an alert to the personal electronic parking system users mobile device and/or a parking enforcement authority's device, if the duration is shorter than the initially entered time, repeating the process from the start.

3. The method as recited in claim 2, wherein the geolocation coordinates are determined from a geolocation database query, automatic geolocation with cellular or Wi-Fi triangulation, GPS or manual input.

4. The method as recited in claim 2, wherein the confirmed time is fixed, adjustable according to a predetermined policy, or dynamically updated depending on external data.

5. The method as recited in claim 2, wherein the alert is sent to the personal electronic parking system user warning the personal electronic parking system user of an expired parking session and suggesting a parking duration extension.

6. The method as recited in claim 2, wherein the alert is sent to a parking enforcement authority mobile device via a parking enforcement's server.

7. The method as recited in claim 6, further comprising parking violation transmission and payment collection comprising the following steps:
    preparing and issuing a parking violation ticket on the parking enforcement's server;
    transmitting the parking violation ticket to the personal electronic parking system user via a message and providing the personal electronic parking system user with a payment gateway to pay a violation fine;
    the personal electronic parking system user remotely paying the violation fine on the personal electronic parking system user's mobile device via the payment gateway; and
    the payment gateway transmitting the payment to the parking enforcement's server.

8. The method as recited in claim 7, wherein the message is sent to the personal electronic parking system user via an application, a mobile application, an email, SMS, a vehicle application, a website, personal electronic parking hardware device, or a user interaction modality.

9. The method as recited in claim 2, further comprising providing parking availability predictions and recommendations for parking spaces for the personal electronic parking system user to park the vehicle, wherein providing the parking availability predictions and recommendations comprises the following steps:

collecting data from external sensors;
storing the collected data and historical data in a storage unit;
inputting the stored data into a machine classifier;
identifying important features from the stored data by the machine classifier;
extracting the important features and training a predictor model on a server to predict available parking spaces over time and spatial area;
training a recommender model;
once trained, the predictor model providing a predicted parking space availability matrix;
ranking the predicted parking space availability matrix using the recommender model;
recommending parking to the personal electronic parking system user based on user metrics and external data.

10. The method as recited in claim 9, wherein the user metrics include a user's profile, a user's past behavior, distance, safety, cost, operational hours or crowd sourced data.

11. The method as recited in claim 9, wherein the external data includes deals, discounts, coupons, local business promotions.

12. The method as recited in claim 9 further comprising:
continuously collecting, storing and inputting new data and updating the predictor and recommender models with the new data; and
combining the stored data and personal electronic parking system user input to compute confidence probability for predictions and recommendations.

13. The method as recited in claim 10, wherein the crowd sourced data includes behavioral data from one or more personal electronic parking system users including spatial temporal parking patterns, choices of parking locations or garages, usage of coupons or promotions, parking duration or vehicle type.

14. The method as recited in claim 13, wherein the behavioral data is collected via a personal electronic parking system user interface or from third party servers or services.

15. The method as recited in claim 13, further comprising providing incentives for the crowd sourced data, wherein the incentives include advertisements for discounts, reward points or free products.

16. A machine learning system for on-street and off-street parking availability predictions and recommendations, the system comprising:
a cloud network;
at least one sensor interface for collecting data;
a parking predictor model predicting parking space availability;
a recommender model providing recommendations to a personal electronic parking system user from the predicted parking spaces available;
at least one storage unit and a classifier located on edge nodes, the cloud network or a hybrid edge-cloud network, wherein the at least one storage unit stores the collected data from the at least one sensor interface and the classifier, selects and extracts important features from the stored data for training the parking predictor model and the recommender model.

17. The machine learning system as recited in claim 16, wherein the parking predictor model further comprises sub predictors and a meta predictor, the meta predictor combining outputs from each of the sub predictors for a final prediction.

18. The machine learning system as recited in claim 16, wherein the at least one sensor interfaces are GPS, at least one set of auxiliary information, at least one video feed, at least one audio input, proximity information, or crowd source gathered information.

19. The machine learning system as recited in claim 16, wherein the classifier corrects its output dynamically and in real-time based on the collected data and received feedback.

* * * * *